June 3, 1941.   R. FERRANTE   2,244,520
PERCOLATOR CARTRIDGE
Filed Aug. 23, 1939

INVENTOR
Rose Ferrante
BY
her ATTORNEY

Patented June 3, 1941

2,244,520

UNITED STATES PATENT OFFICE 2,244,520

PERCOLATOR CARTRIDGE

Rose Ferrante, New York, N. Y.

Application August 23, 1939, Serial No. 291,467

2 Claims. (Cl. 99—77.1)

This invention relates to percolator cartridges, bags, or similar containers for the reception of coffee, tea, or the like, from which substances beverages are usually made by subjecting them to the flow of hot liquid, which absorbs their essence.

One of the objects of the present invention is to provide a very simple, inexpensive and useful device of this kind wherein a measured quantity of a beverage-producing substance may be confined to produce a certain amount of beverage of desired quantity and strength.

Another object of my invention is to provide a cartridge or receptacle which may be easily constructed and manufactured on a large scale, which may be readily placed into a percolator and which just as readily removed therefrom after having been used, and which will automatically adjust itself to the shape of the container and fill the entire space usually allotted for the loose beverage-producing substance intended for percolators.

Another important object of this invention is to produce a coffee cartridge in the shape substantially resembling a generously curved crook, wherein one of its legs is short, whereas the other leg is considerably longer, and wherein the longer leg is adapted to overlie the shorter leg, and wherein the shorter leg is permanently closed while the longer leg is originally open and is closed by drawing and holding together its open edge, which latter serves for removing the cartridge from the percolator after use.

Another object of this invention is to provide a bag-like elongated cartridge which is capable of being placed into a percolator in the form substantially resembling a spiral, and wherein the ends of the spiral substantially overlap one another.

The foregoing and still further objects and advantages of the present invention will become more fully apparent from the ensuing description of the accompanying drawing, which, although showing specific forms of my device, are by no means intended to limit me to the actual illustrations, and in which Fig. 1 is a vertical cross sectional view through a percolator cup provided with a riser, and wherein is placed my coffee cartridge.

Figure 1:
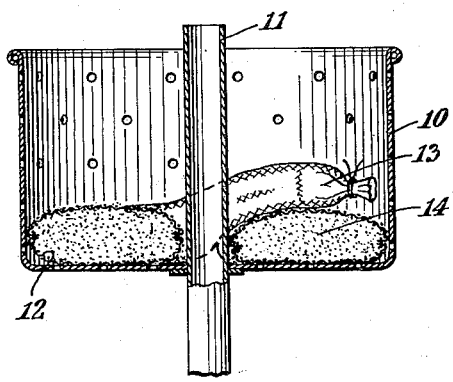
Figure 2:
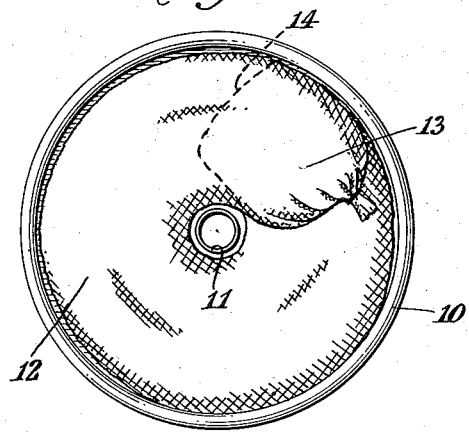
Fig. 2 is a top view of Fig. 1.

Referring now more specifically to the figures, numeral 10 denotes a percolator cup provided with a water riser 11, through which latter water is drawn from the bottom of the percolator and is discharged over the coffee powder or ground contained in cup 10.

Within the cup will be seen a cross section through my cartridge 12, the longer end 13 of which overlies its shorter end 14. It will be seen that the cartridge is wound in the form of a spiral about riser 11 and completely fills the bottom of cup 10. The ends 13 and 14 so substantially overlay one another that there is no space left open between the ends of the cartridge, whereby the water issuing from riser 11 is forced to completely penetrate the entire body of the coffee contained in the cartridge. The cartridge is preferably so constructed as to contain a measured quantity of coffee, or any other beverage-producing substance, for producing a certain number of cups of the beverage at desired strength.

Figure 3:
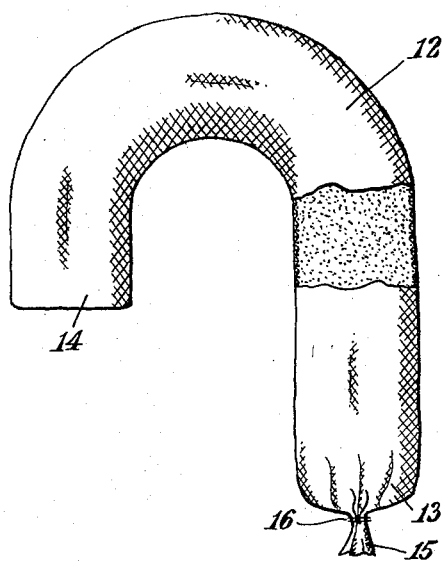
Fig. 3 is a top view of one of the forms of my filled cartridge.
Figure 4:
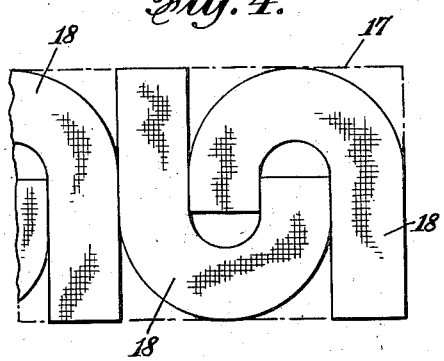
Fig. 4 is a diagram illustrating how the cartridge material is cut up to the desired shape.

From Fig. 3 it will be seen that the cartridge 12 is formed in the shape of a wide crook with a longer leg 13 and a shorter leg 14, and wherein the shorter leg is permanently closed. The longer leg is provided with an opening at its end, which is closed by drawing together the edge of the opening, which is kept closed by holding the drawn-together folds by a cord or string 16.

In fabricating my devices shown in this figure, I preferably apply the following method. A strip of coarse fabric 17 is cut in crook-shaped forms 18 so that the short end of one form terminates in the crook of the next form, whereas the long ends of the forms extend to the exterior edges of the material. In this way a minimium of material is wasted.

Figure 5:
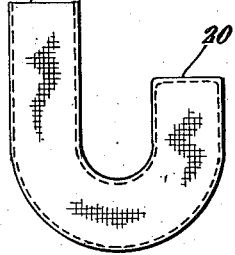
Fig. 5 illustrates an empty cartridge ready for the reception of coffee.

The cut or stamped-out forms are placed upon one another, as indicated in Fig. 5, and their edges are so sewn together that the longer ends of the forms remain open at 19, while the shorter ends 20 of the edges are completely closed, whereby a substantially U-shaped bag is produced, with the longer leg end being open. When the sewing is completed, the bag is turned inside out and is then filled through open end 19. Now the edge of the open end is drawn together and securely bound, as indicated at 15 in Fig. 3. Depending upon the size and the shape and the length of the legs, the desired quantity of beverage-producing substance placed in the bag is determined.

Figure 6:
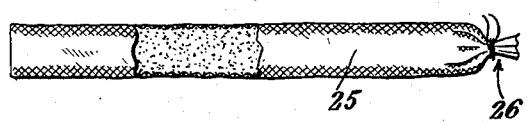
Fig. 6 is a filled cartridge of another form.
Figure 7:
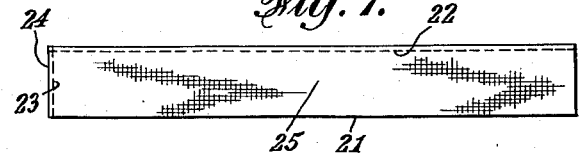
Fig. 7 is the same cartridge empty.

A somewhat simpler construction of my cartridge is shown in Figs. 6 and 7, consisting of an elongated strip of material which is folded upon itself along line 21, whereupon the opposite long overlapping edges of the material are sewn along line 22, the sewing continuing at 23 to close one end 24. The resulting cartridge 25 is then filled with a beverage-producing substance and is closed at its open end at 26 in the manner stated above in connection with Fig. 3.

Both forms of my cartridge described and illustrated constitute elongated containers or bags which are sufficiently flexible to permit them to be wound about riser 11 to form a spiral, and wherein the end with the drawn-together edge overlaps the originally closed end of the cartridge. With either one of the two embodiments of my invention the bottom of cup 10 is completely or substantially completely filled so as to assure all of the beverage-producing substances contained in the cartridge to be thoroughly used up in the usual manner. After use, it is a simple matter to remove the cartridge from cup 10 without leaving any of the objectionable particles usually left within the cup when loose beverage-producing material is employed.

While I am aware of devices similar to the one just described, I believe myself to be the first who introduces a cartridge containing beverage-producing substances, possessing the advantages summarized below.

First, my carriage is of a crook-shape formation, due to which peculiar construction it will so-to-speak automatically wind itself around the percolator riser when inserted into the percolator cup; second, in its inserted position it will complete more than a full circle, in fact it will form a portion of a spiral, with the ends of the cartridge overlapping, thus increasing the depth of the content of the cartridge at the overlapping portions; third, it will spread uniformly over the bottom of the cup and fully cover its entire area; and fourth, it will effectively prevent water, issuing from the riser, from passing freely through the bottom of the cup without penetrating at least a single layer of the content of the cartridge.

I also believe myself to be the first who produces an elongated cartridge for beverage-producing substances which, due to the generous interior curvature of its crook-like shape may be easily and efficiently manufactured at extremely low cost, which latter will but slightly affect the price of the substance ordinarily sold in bulk.

The slight increase in cost is far overbalanced by the advantages gained in the use of my device. The usual spilling of beverage-producing substance being entered into cup 10 is completely eliminated. Similarly, my device avoids the annoying removal of loose residue from the cup since the entire cartridge is bodily removed and leaves but a thin sediment which may be readily cleansed.

Another advantage in the use of my cartridge resides in the fact that a pre-measured quantity is always available for any occasion, and that the cartridge may be stored in its spiral shape or otherwise in the usually round tin containers presently employed for loose beverage-producing substances.

I prefer to produce cartridges of uniform minimum contents, adapted for instance for making two cups of coffee. When four or six cups are required, it is a simple matter to place two or three cartridges in the percolator.

While the illustrations portray but two specific structures of my cartridge it is readily evident that their shape and size may be varied in accordance with requirements, and I therefore wish it to be understood that in compliance with demand I shall have the right to make changes and improvements therein, without departing from the broad scope of my invention, as expressed in the annexed claims.

I claim:

1. A percolator cartridge consisting of a substantially crook-shaped hollow formation terminating in short and longer ends, which are adapted to overlap one another when the cartridge is placed into a percolator in such a way that the short end is beneath the longer end, said short end being permanently closed, the longer end having a closeable opening, the edge of which is held together for closing it, and is adapted to facilitate the removal of the cartridge from the percolator after use.

2. A crook-shaped cartridge for percolators having a closed short and a longer open end, the edge of the latter end being drawn together for closing it, said cartridge being adapted to be curved for use to substantially the form of a spiral and wherein the ends of the cartridge substantially overlie one another.

ROSE FERRANTE.